United States Patent
Aakolk et al.

(10) Patent No.: US 10,043,140 B2
(45) Date of Patent: Aug. 7, 2018

(54) IN-MEMORY BASED DATABASE VIEW FOR A BUSINESS RULE MANAGEMENT APPLICATION

(71) Applicants: Michael Aakolk, Wiesloch (DE); Andrea Waldi, Viernheim (DE); Carsten Ziegler, Walldorf (DE); Marco Wuest, Nordheim (DE); Joydeep Paul, Shillong (IN)

(72) Inventors: Michael Aakolk, Wiesloch (DE); Andrea Waldi, Viernheim (DE); Carsten Ziegler, Walldorf (DE); Marco Wuest, Nordheim (DE); Joydeep Paul, Shillong (IN)

(73) Assignee: SAP SE, Walldorf (DE)

( * ) Notice: Subject to any disclaimer, the term of this patent is extended or adjusted under 35 U.S.C. 154(b) by 686 days.

(21) Appl. No.: 14/251,903

(22) Filed: Apr. 14, 2014

(65) Prior Publication Data
US 2015/0293969 A1 Oct. 15, 2015

(51) Int. Cl.
*G06F 17/30* (2006.01)
*G06Q 10/00* (2012.01)

(52) U.S. Cl.
CPC ....... *G06Q 10/00* (2013.01); *G06F 17/30345* (2013.01)

(58) Field of Classification Search
CPC .... G06Q 10/10; G06Q 30/0635; G06Q 10/10; G06Q 10/00; G06F 17/30678; G06F 17/30345
See application file for complete search history.

(56) References Cited

U.S. PATENT DOCUMENTS

| | | | |
|---|---|---|---|
| 7,350,033 B2 | 3/2008 | Hofmann et al. |
| 7,475,088 B2 | 1/2009 | Ziegler |
| 7,574,677 B2 | 8/2009 | Wuest |
| 7,599,903 B2 | 10/2009 | Gunther et al. |
| 7,797,708 B2 | 9/2010 | Weber et al. |
| 7,823,088 B2 | 10/2010 | Wuest |
| 7,865,900 B2 | 1/2011 | Aakolk et al. |
| 7,937,354 B2 | 5/2011 | Brelage et al. |
| 7,962,436 B2 | 6/2011 | Brelage et al. |

(Continued)

OTHER PUBLICATIONS

Four Layers of TCP/IP model, Application Layer, Transport Layer, Internet Layer, Network Access Layer, Comparison between TCP/IP and OSI models, 2013, pp. 1-12.*

(Continued)

*Primary Examiner* — Albert M Phillips, III
(74) *Attorney, Agent, or Firm* — Fish & Richardson P.C.

(57) ABSTRACT

In one aspect, a computer-implemented method comprises obtaining, in a business rule management application, a selection of one or more in-memory database objects, obtaining, in the business rule management application, a definition of one or more business rules, generating a business rule management application object, wherein the business rule management application object includes a representation of the one or more business rules and a representation of one or more results of the application of the one or more business rules on the one or more in-memory database objects, the method further comprising providing the business rule management application object for storage in the in-memory database.

19 Claims, 4 Drawing Sheets

(56) References Cited

U.S. PATENT DOCUMENTS

| | | |
|---|---|---|
| 7,996,850 B2 | 8/2011 | Massmann et al. |
| 8,001,521 B2 | 8/2011 | Aakolk et al. |
| 8,020,051 B2 | 9/2011 | Ziegler |
| 8,074,228 B2 | 12/2011 | Aakolk et al. |
| 8,108,331 B2 | 1/2012 | Ziegler et al. |
| 8,156,137 B2 | 4/2012 | Aakolk et al. |
| 8,196,126 B2 | 6/2012 | Ziegler |
| 8,433,664 B2 | 4/2013 | Ziegler et al. |
| 8,448,194 B2 | 5/2013 | Ziegler |
| 8,489,729 B2 | 7/2013 | Weidenschlager |
| 8,601,490 B2 | 12/2013 | Sureshan et al. |
| 8,626,543 B2 | 1/2014 | Liu et al. |
| 8,630,969 B2 | 1/2014 | Ziegler |
| 9,419,884 B1 * | 8/2016 | Li ............. H04L 43/50 |
| 2007/0157078 A1 * | 7/2007 | Anderson ......... G06F 17/227 |
| | | 715/207 |
| 2009/0157739 A1 | 6/2009 | Ziegler |
| 2010/0030604 A1 | 2/2010 | Cummins |
| 2010/0057666 A1 | 3/2010 | Ziegler et al. |
| 2011/0087689 A1 * | 4/2011 | Ziegler .......... G06Q 10/10 |
| | | 707/769 |
| 2012/0239680 A1 | 9/2012 | Gudla et al. |
| 2013/0117318 A1 | 5/2013 | Paul et al. |
| 2013/0117323 A1 | 5/2013 | Lohiya et al. |
| 2013/0174118 A1 | 7/2013 | Ziegler |
| 2013/0282746 A1 | 10/2013 | Balko et al. |
| 2013/0318028 A1 | 11/2013 | Ziegler |
| 2013/0338980 A1 | 12/2013 | Paul et al. |
| 2014/0006106 A1 | 1/2014 | Malov et al. |
| 2014/0006216 A1 * | 1/2014 | Malapati ......... G06Q 30/0635 |
| | | 705/26.81 |

OTHER PUBLICATIONS

Garcia-Molina, Main Memory Database Systems: An Overview, Dec. 1992, pp. 509-516.*

Ovung, Building a Tax Calculation Application, pp. 1-11 (Year: 2008).*

* cited by examiner

IN-MEMORY BASED DATABASE VIEW FOR A BUSINESS RULE MANAGEMENT APPLICATION

TECHNICAL FIELD

The present disclosure relates to methods and systems for database systems. In particular, the present disclosure relates to a method for processing business logic within an in-memory database.

BACKGROUND

Today, many software vendors offer business rule management applications. These business rule management applications can empower users having no or little expertise in programming of database applications to set up, modify, and manage business rules. In order to achieve this goal, business rule management applications can facilitate the user to input a business rule (e.g., "if last year's sales for customer A have been higher than 1,000,000 $US, grant a 20% discount") with a syntax similar to the syntax business users are used to in their everyday work. Many business rule management applications have developed domain specific programming languages that can process these inputs into executable code.

On the other hand, businesses assemble vast amounts of data. Ideally, this data can be processed at near real-time in the business intelligence applications. In addition, changes to the data should be propagated as fast as possible to avoid executing business logic on outdated data. An in-memory database is a database management system that primarily relies on main memory for computer data storage. It is contrasted with database management systems that employ a disk storage mechanism.

SUMMARY

In a first general aspect of the present disclosure, a computer-implemented method comprises obtaining, in a business rule management application, a selection of one or more in-memory database objects, obtaining, in the business rule management application, a definition of one or more business rules, generating a business rule management application object, wherein the business rule management application object includes a representation of the one or more business rules and a representation of one or more results of the application of the one or more business rules on the one or more in-memory database objects, the method further comprising providing the business rule management application object for storage in the in-memory database.

In a second aspect according to the first aspect, providing the business rule management application object for storage in the in-memory data base includes generating, based on the business rule management application object, an in-memory database application object including a representation of the one or more business rules.

In a third aspect according to the second aspect, the in-memory database application object includes an Extensible Markup Language (XML) object.

In a fourth aspect according to the second or third aspect, the method further comprises storing the memory database application object in the in-memory database.

In a fifth aspect according to anyone of the second to fourths aspects, the method further comprises generating an in-memory runtime object based on the in-memory database application object.

In a sixth aspect according to the fifth aspect, the in-memory runtime object includes an SQL procedure.

In a seventh aspect according to the fifth or sixth aspect, the in-memory runtime object includes one or more in-memory database objects including the one or more results of the application of the one or more business rules on the one or more in-memory database objects.

In an eighth aspect according to anyone of the second to fourths aspects, the one or more in-memory database objects include one or more new columns, the one or more new columns including the one or more results of the application of the one or more business rules on the one or more in-memory database objects.

In a ninth aspect according to anyone of the preceding aspects, the method further comprises generating a runtime object of the business rule management application based on the business rule management application object and storing the runtime object of the business rule management application in an application layer of the business rule management application.

In a tenth aspect according to the ninth aspect, the method further comprises calling the runtime object of the business rule management application from the business rule management application, executing the in-memory runtime object to produce one or more results of the application of the one or more business rules on the one or more in-memory database objects and providing the one or more results to the business rule management application.

In an eleventh aspect according to the tenth aspect, calling the runtime object includes generating a representation of the business rule management application object on a graphical user interface of the business rule management application.

In a twelfth aspect according to the eleventh aspect, the representation displays information characterizing a set of input parameters corresponding to input parameters of an in-memory runtime object generated based on the business rule management application object.

In a thirteenth aspect according to the eleventh or twelfth aspect, the representation displays information characterizing the one or more in-memory database objects.

In a fourteenth aspect according to anyone of the eleventh to thirteenth aspects, the representation displays information characterizing the one or more results.

In a fifteenth aspect according to anyone of the eleventh to fourteenth aspects, calling the runtime object of the business rule management application includes executing an SQL command.

In a sixteenth aspect according to anyone of the preceding aspects, the one or more business rules define a Boolean expression, a case expression, a decision table, a decision tree, a search tree, a loop expression, a database table operation, a value range check or an arbitrary formula expression.

In a seventeenth aspect according to anyone of the preceding aspects, the one or more in-memory database objects include a table object, a table type object, an attribute view object, wherein an attribute view references one or more data items in other tables of the in-memory database, an analytical view object, wherein an analytic view defines on or more functions operable on data items in the in-memory data base, or an calculation view object, wherein a calculation view is operable to provide composites of other views.

In an eighteenth aspect according to the seventeenth aspect, the one or more in-memory database objects include a table type object including a representation of the one or more business rules, and the method further comprises obtaining data during a call of an in-memory procedure generated based on the business rule management application object, typing the obtained data with a table type defined in the table type object, executing the one or more business rules on the obtained data to obtain the one or more results of the application of the one or more business rules, adding new database columns including the one or more results and providing the typed obtained data and the database columns including the one or more results to the business rule management application.

In a second general aspect of the present disclosure, a computer readable medium storing instructions thereon which when executed by a processor cause the processor to perform operations of anyone of the methods of the first to eighteenth aspects.

In a third general aspect of the present disclosure, a system comprises one or more processors and a computer-readable medium storing instructions executable by the one or more processors to perform operations of anyone of the methods of the first to eighteenth aspects.

DETAILED DESCRIPTION

This disclosure relates to methods and systems for database systems. In particular, the present disclosure relates to a method for processing business logic (also referred to as "business rules" herein) in an in-memory database.

The subject-matter described in this disclosure can be implemented in particular embodiments so as to realize one or more of the following advantages.

First, business logic defined can be conveniently defined in a business rule management application and, at the same time, performance advantages of in-memory database data procession can be exploited.

Second, data can be fetched from an in-memory database onto a business rule management application server. This data can then be processed further in the business rule management system environment. This can make it easier for non-technicians to work with in-memory data.

Third, business logic defined in a business rule management application can be seamlessly integrated into an in-memory database. In particular, new in-memory database objects (e.g., new columns of a database table) can be generated by the business logic in the in-memory database. The generated in in-memory database objects can be consumed in the business rule management application environment. This can empower non-technically skilled persons to work with the generated data objects.

Fourth, complex business logic can be deployed in an in-memory database to reap the performance benefits of in-memory database processing.

In the detailed description, elements of an example business rule management application and an example in-memory database system are discussed in connection with FIG. 1. Subsequently, an example business rule management application object of the present invention is discussed in the connection with FIG. 2. In connection with FIG. 3, details of example code generation and deployment processes of business logic in an in-memory database will be explained. Lastly, example methods for deploying and executing business logic in an in-memory database are described in connection with FIG. 4.

Firstly, the structure of an example business rule management application and an example in-memory database application will be described in connection with FIG. 1. The business rule management application and the in-memory database application can be part of a database system.

A business rule management application 106 includes a business logic workbench 108, a business rule management application core 107, a business rule repository 109, and a business data repository 110. The business rule management application can be accessed by a user via a user device 102. The user device 102 can include, e.g., any device from the list consisting of a personal computer, a mobile device, or a workstation. The business rule management application 106 can be hosted on the application layer of a business intelligence system.

The different functional units of the business rule management application 106 will subsequently be explained in more detail. The business logic workbench 108 can provide an environment for a user to organize, manage, define, and modify business logic. It can include search and navigation functions to find predetermined business logic objects. Moreover, it can include tools to create and change business logic objects, including associated business rules. It can be equipped with a graphical user interface for presentation on one or more user devices 102. For instance, a user can access the business rule management application via a mobile device and define a new business rule. The business rule application core 107 can receive the defined business rules from the business logic workbench 108. Thus, the business logic workbench 108 provides a business logic authoring environment. In addition, the business logic workbench 108 can present a user with results of the application of business logic on data in a database. The business rules received from the business logic workbench 108 can be stored in a business rule repository 110. In addition, the business rule application core 107 can retrieve previously-defined business rules from the business rule repository 110 and transmit them to the business logic workbench 108. Moreover, the business rule application core 107 can include a business rules engine (not pictured) for generating executable code from the business rules defined by the user on the business logic workbench 108, and for executing the generated code on data from a data repository 109. The data repository 109 can be any database including the business data of the user.

In some prior art business rule management applications, the data repository 109 included persistent memory to cope with potentially large amounts of business data. Access times to this persistent memory might be comparatively slow. Therefore, when executing one or more business rules defined in the business rule management application, the required database objects (e.g., a table including the sales data for the year 2013) were loaded into the memory of the application server hosting the business rule management application. Subsequently, the respective business logic can be applied to the loaded database objects.

Figure 1:
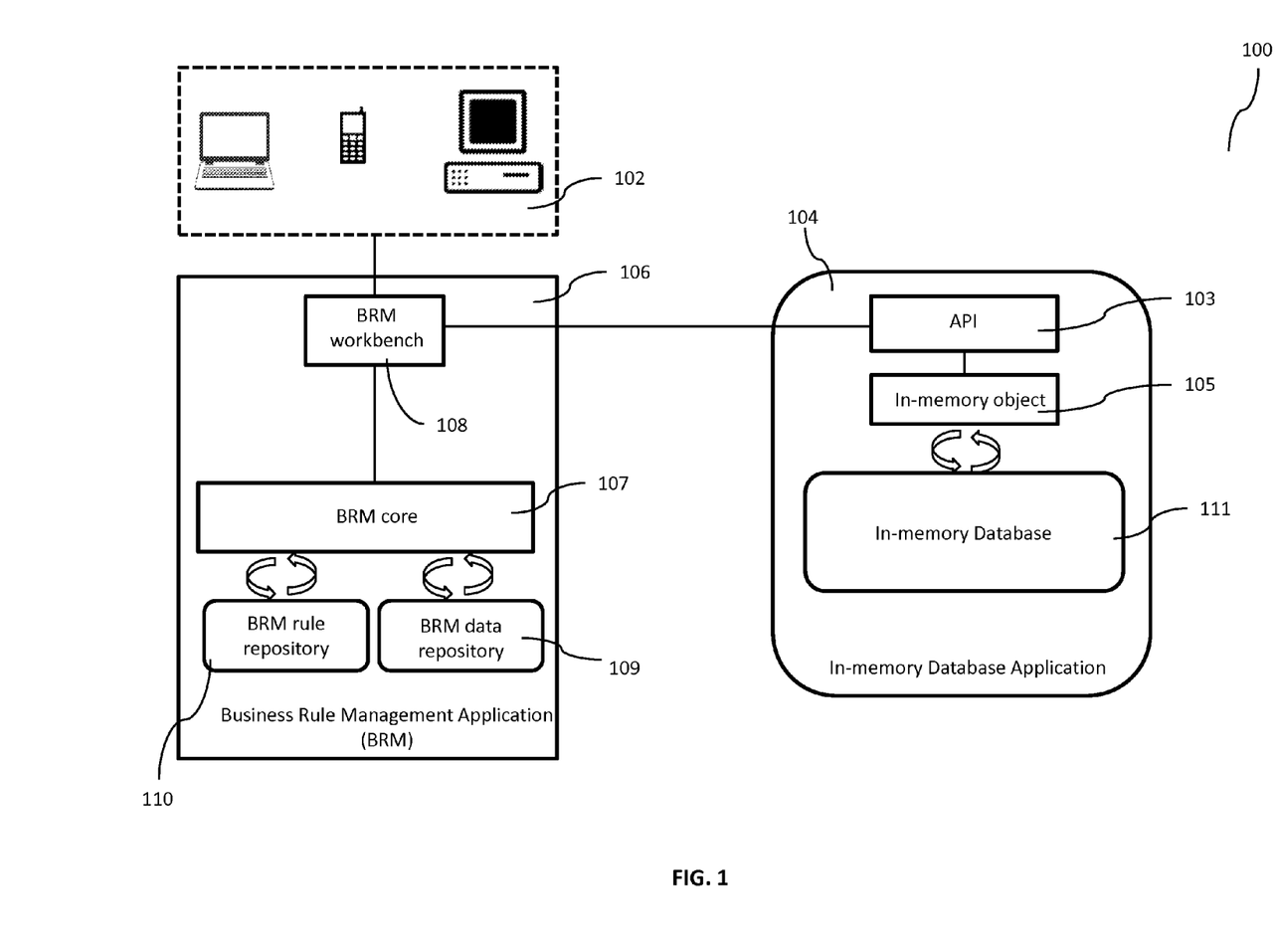
FIG. 1 illustrates a business rule management system and in-memory database system.

In the example system of FIG. 1, an alternative approach to deploy the defined business logic is illustrated. Instead of executing the business logic on the application server of the business rule management application, the defined business rules are deployed in, and at least partially executed within, an in-memory database. Before this process is explained in more detail, the structure and components of the in memory database will be explained.

An example in-memory database application 104 is shown on the right hand side of FIG. 1. The in-memory database application 104 includes an application programming interface 103 to allow other applications to access the in-memory database application. Moreover the in-memory database application can execute a program 105 for accessing other components of the in-memory database 111 (for example the in-memory data repository) or for performing calculations in the in-memory database 111. The in-memory database application can involve multiple additional components. As shown in FIG. 1, the application programming interface 103 can be used to deploy database objects generated in the business rule management application in the in-memory database. This process will be described in greater detail below.

Figure 2:
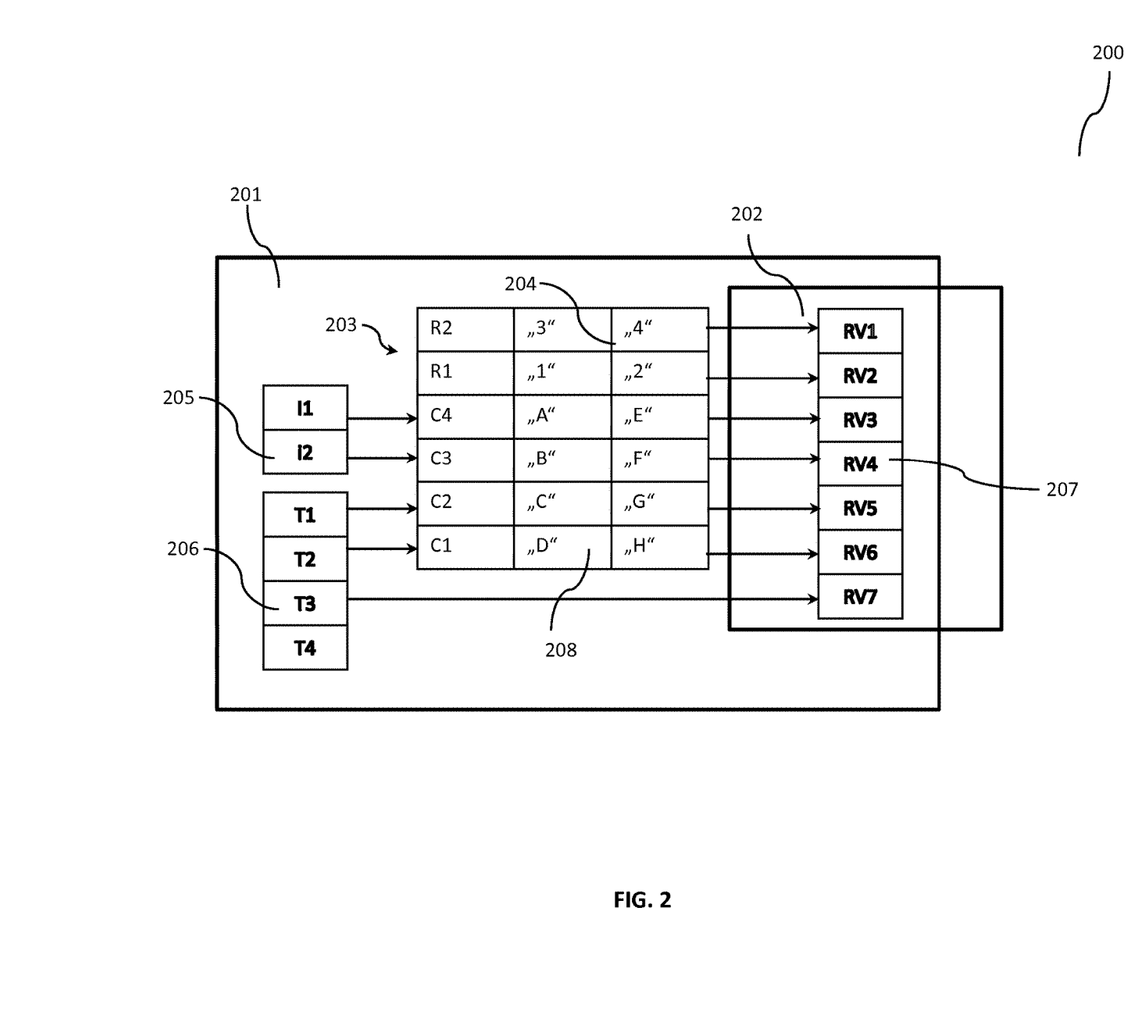
FIG. 2 illustrates a schematic representation of an example business rule management application object.

Subsequently, an example process of generating an in-memory database object in an business rule management application will be explained in connection with FIG. 1 and FIG. 2. FIG. 2 shows schematic representation of an example business rule management application object (also referred to as "dynamic database view" herein). In the example of FIG. 2, the business rule management application object includes four elements: A representation of at least a portion of an in-memory database object 206, a representation of a predetermined piece of business logic (e.g., a decision table 203 in the example of FIG. 2), a set of input parameters 205 and a set of calculated results 207. In general, the input parameters 205 and the results 207 are optional. Other examples of business rule management application objects can not include input parameters 205 and results 207, or can include only input parameters 205 but no results 207 or only results 207 but no input parameters.

The elements of the business rule management application object 201 will now be explained in more detail. The optional set of input parameters 205 (e.g., two input parameters "I1" and "I2" in the example of FIG. 2) can include any variable to be handed over to the business rule management application object 201 if it is called in run time of the database system of which the business rule management application and the in-memory database application form a part. For example, an input parameter can be an element, a database table, or a structure combining multiple elements or tables, where an element is one selected of the group consisting of a number, a string, a number with an associated unit (e.g., an amount with a corresponding currency indictor or a measurement value with a corresponding measurement unit), a point in time, or a Boolean value, among others.

Moreover, the business rule management application object 201 includes a representation of at least a portion of an in-memory database object 206. The data in the portion of an in-memory database object 206 is to be processed by the logic defined in the business rule management application object 201 in runtime of the business rule management application object 201. For instance, in the example of FIG. 2, the logic of the business rule management application object 201 is decision table 203. Thus, the data in the portion of an in-memory database object is to be processed by the decision table to generate one or more results 207. In general, a representation of any in-memory database object can be included in the business rule management application object 201. For example, the in-memory database object can include a table object, a table type object, and an attribute view object, among others, where an attribute view references one or more data items in other tables of the in-memory database, an analytical view object, where an analytic view defines on or more functions operable on data items in the in-memory database, or a calculation view object, where the calculation view is operable to provide composites of other views. The business rule management application object 201 can also include a representation of two or more in-memory database objects or of only a portion of an in-memory database object (e.g., one or more columns of a table object).

Furthermore, the business rule management application object 201 includes a representation of a predetermined piece of business logic. In the example of FIG. 2, the piece of business logic is a decision table (i.e., decision table 203. A decision table can include one or more condition columns 208 (e.g., four condition columns defining four conditions C1" to "C4" in the example of FIG. 2) and one or more result columns 204 (e.g., two result columns defining two results "R1" and "R2" in the example of FIG. 2). The predetermined piece of business logic can be any definition of business logic. For instance, the predetermined piece of business logic can be include one or more of the following: a Boolean expression (e.g., for performing logical operation such as AND, OR), a case expression (e.g., several IF-statements in a chain), a database lookup expression (for fetching data from a database), a decision table (for sequentially processing business rules), a decision tree (e.g., a binary tree like graph modeling decisions), a search tree (where a more than three child nodes can be associated with a parent node), a loop expression (a container for a set of business rules to be executed several times), a database table operation (e.g., an aggregate operation, an average operation, a count operation, a minimum operation, a maximum operation or a select operation), a value range check (to check if a particular value lies within a particular range), an arbitrary formula expression (e. g., "(COL1+COL2) *FLOOR(COL3)" which determines the sum of two database columns (COL1 and COL2) and a set of integral values that is not greater than the entries of a third database column COL3, and multiplies the sum and the set of integral values) or any other suitable business logic. In particular, the predetermined piece of business logic can be a user defined function in which a user can freely define potentially complex business logic.

Last, the business rule management application object 201 includes an optional set of results 207 (e.g., seven results "RV1" to "RV7" in the example of FIG. 2). In runtime, at least some (or all) of the one or more results 207 can be generated by an application of the predetermined piece of business logic on the data in the portion of the in-memory database objects represented in the business rule management application object 201. If there are input parameters defined in the business rule management application object 201, at least some of the results can also be generated by the application of the predetermined piece of business logic on the input parameters. Alternatively or in addition, a portion of the in-memory database objects represented in the business rule management application object 201 can be included directly in the results (e.g., a column of an in-memory database table is included in the results). Alternatively or in addition, a portion of the input parameters of the business rule management application object 201 can be included directly in the results.

After having described the elements of the business rule management application object in abstract terms, an example will be given. A decision table can represent a process of processing an application for car insurance.

Example input parameters can be the age of the applicant, the number of accidents for a particular applicant, the type of car, and so on. Example conditions of the decision table could be if the driver is between 18 and 22, between 23 and 30, between 31 and 65, or older than 65, if a number of past accidents of the driver is 0, 1 or 2, or greater than 2, and so on. Results of the decision table could include that the application is directly declined and a letter of rejection is sent, that the applicant falls within a high risk or a low risk tariff and that an offer is to be sent via email or that additional information is required and the applicant should be called to gather the information.

The definition of the business rule management application object occurs in the business rule management application. As described above, a user can use a graphical user interface provided by the business rule management application to define the business rule management application object. For instance, in order to define a business rule management application object as shown in FIG. 2, the user can select the input parameters 205 and the in-memory database objects 206 to be represented in the new business rule management application object. Moreover, via the business rule management application, the user can define the business logic of the business rule management application object and the optional results to be returned when the business rule management application object is executed. In one example, a graphical user interface of the business rule management application can have one tab for defining each of the elements of the business rule management application object. In addition, a business rule management application can provide libraries of predefined or previously defined elements of a business rule management application to be selected by a user. The in-memory database objects represented in the business rule management application object can be mapped on respective business rule management application objects included in the defined business rule management application object in design time. In this manner, a user can exploit the amenities of the business rule management application environment to define a business rule management application object. For instance, a non-technically skilled user (e.g., a manager) can define the business rule management application object.

In the above described car insurance example, a sales person could want to define a business rule management application object that processes the applications of a certain week and returns a list of the applicants who should be called back. In addition, the contact data of the applicants who should be called back should be returned and, if available, information regarding the credit-worthiness of the applicants. In order to achieve this task, data of two different database tables has to be processed: A first table includes the application data and a second table includes information regarding the credit-worthiness of current and past clients of the assurance company. The business rule management application can provide the user with a convenient environment to define the above described business rule management application object. For example, the decision table representing the company's process of processing an application for car insurance can be stored in a registry of the business rule management application. The user can select the in-memory database objects and define as an input parameter the calendar week. Then, the user can select the fields or columns to be included in the results.

Figure 3:
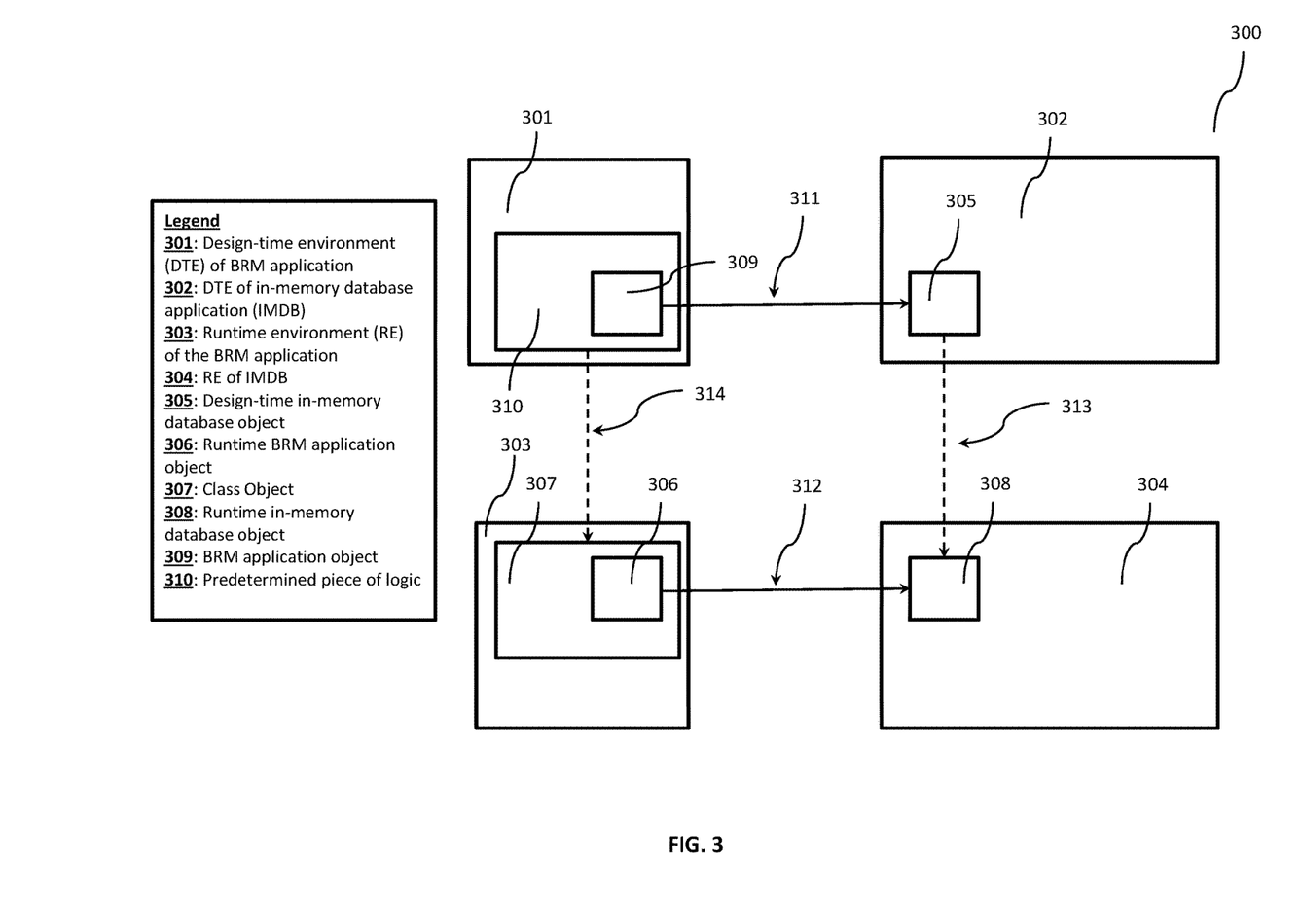
FIG. 3 illustrates an example code generation process in an in-memory database and a business rule management application.

FIG. 3 illustrates the deployment and execution of the business rule management application object in the in-memory database application. The design time environment 301 of the business rule management application is represented by the box in the upper left corner of FIG. 3. As described above, a design time instance of a business rule management application object 309 can be defined by a user in the business rule management application. The business rule management application object 309 can include a representation of a predetermined piece of business logic 310. In design time, a design time instance of an in-memory database object can be generated from the business rule management application object 309. In other words, the business rule management application object is deployed in the in-memory database application (e.g., via a programming interface application such as the programming interface application 103 in FIG. 1). This deployment operation can include translating 311 the business rule management application object 309 into a design-time in-memory database object 305 that can be interpreted by the in-memory database application. This process can include using metadata of the business rule management application object. An example design-time in-memory database object 305 is depicted in the upper right corner of FIG. 3 in the design-time environment 302 of the in-memory database application. In one example, the design-time in-memory database object 305 includes an Extensible Markup Language (XML) object. For example, an XML object might include the decision table 203 of the business rule management application object depicted in FIG. 2.

In runtime, a runtime instance of the business rule management application object 306 is generated. In addition, the predetermined piece of business logic can be processed (314) into a class object 307 of the business rule management application (e.g., a class object defining a decision table or other business rule object). As can be seen in the lower left corner of FIG. 3, the runtime instance of the business rule management application object 306 and the class object 307 of the business rule management application are located in a runtime environment 303 of the business rule management application. For instance, the business rule management application can be hosted on an application server of the database system.

In the in-memory database application, a runtime in-memory database object 308 is generated (313) from the design-time in-memory database object 305. The runtime in-memory database object 308 includes code executable in the runtime environment 304 of the in-memory database application. In one example, the runtime in-memory runtime object 308 includes an SQL procedure or another database programming language. In order to execute the runtime in-memory database object 308, the runtime in-memory database object 308 is called in runtime 312. As depicted in FIG. 3, the runtime in-memory database object 308 can be called from a business rule management application. In other examples, the runtime in-memory database object 308 can be called from other components external of the in-memory database application or via an application server of the in-memory database application. When the runtime in-memory database object 308 is called, the predetermined piece of business logic defined in the business rule management application can be executed on the selected in-memory database objects (e.g., selected columns of an in-memory database table). In some examples, this includes generating new in-memory database objects to include the results defined in the business rule management application object (for example, new columns of an in-memory database table or a new in-memory database table). Thus, the process described herein can allow generating new in-memory database objects (e.g., new table columns) based on arbitrary business logic defined in a business rule management application.

As described above, the execution of the runtime in-memory database object 308 can be triggered by a call from the business rule management application. In one example, execution of the runtime in-memory database object 308 can take place via an SQL call. If the business rule management application object includes a set of input parameters (e.g., input parameters 205 shown in FIG. 2), these input parameters can be specified in the call of the runtime in-memory database object 308. Moreover, the executed runtime in-memory database object 308 returns the calculated results defined in the business rule management application object to the business rule management application. The returned results can be mapped onto a business rule management application object. In this manner, the result object can be consumed in the business rule management application. In this manner, the processes described herein benefit from the processing speed of in-memory database application while at the same time allowing a user to define business logic and trigger its execution from a business rule management application.

In the previously-used example, the car insurance database object can be deployed in an in-memory database as described above. Then, the user might call the object (e.g., via a mobile user interface of the business rule management application) and can specify calendar week 5 of 2014 as an input parameter. The generated runtime object in the in-memory database is executed and applies the specified decision table to the application data objects and the credit-worthiness data included in the in-memory database. Subsequently, the user received in the business rule management environment the results including the data for the applicants of calendar week 5 of 2014 and information regarding their credit-worthiness. The user might then process this data further in the business rule management application.

In other examples, the business rule management application object is designed to read at least a portion of an in-memory database object (or one or more in-memory database objects) into an business rule management application. In this example, the business rule management application object does not include a piece of business logic to be executed on the in-memory database. The business rule management application object can still define a set of input parameters. The code deployment process discussed in connection with FIG. 3 is modified in this case. In some examples, no design-time or runtime in-memory database objects 305, 308 have to be generated. The design-time business rule management application object 309 is translated into a runtime business rule management application object 306 that can be called and executed during runtime. Again, the runtime business rule management application object 306 can be executed using an SQL call. The portion of the in-memory database object (or one or more in-memory database objects) is returned to the business rule management application and subsequently can be consumed in the business rule management environment.

As described above, the in-memory database objects represented in the business rule management application object defined in the business rule management application can be a table type object. A table type can describe the structure and functional attributes of an internal database table. A table type can describe the structure and functional attributes of an internal table of a database application. During the call of a business rule management application object including a table type object, data to be typed by the table type can be obtained (e.g., as an argument of an SQL call). In a subsequent operation, the obtained data can be typed with a table type defined in the table type object. Then, any piece of business logic defined in the business rule management application object can be applied to the data typed by the table type and new in-memory database objects (e.g., database columns) can be added in the in-memory database. In a further operation, the added in-memory database objects and, optionally, the typed data can be returned to the business rule management application (or to another application calling the in-memory database object), as described above.

Figure 4:
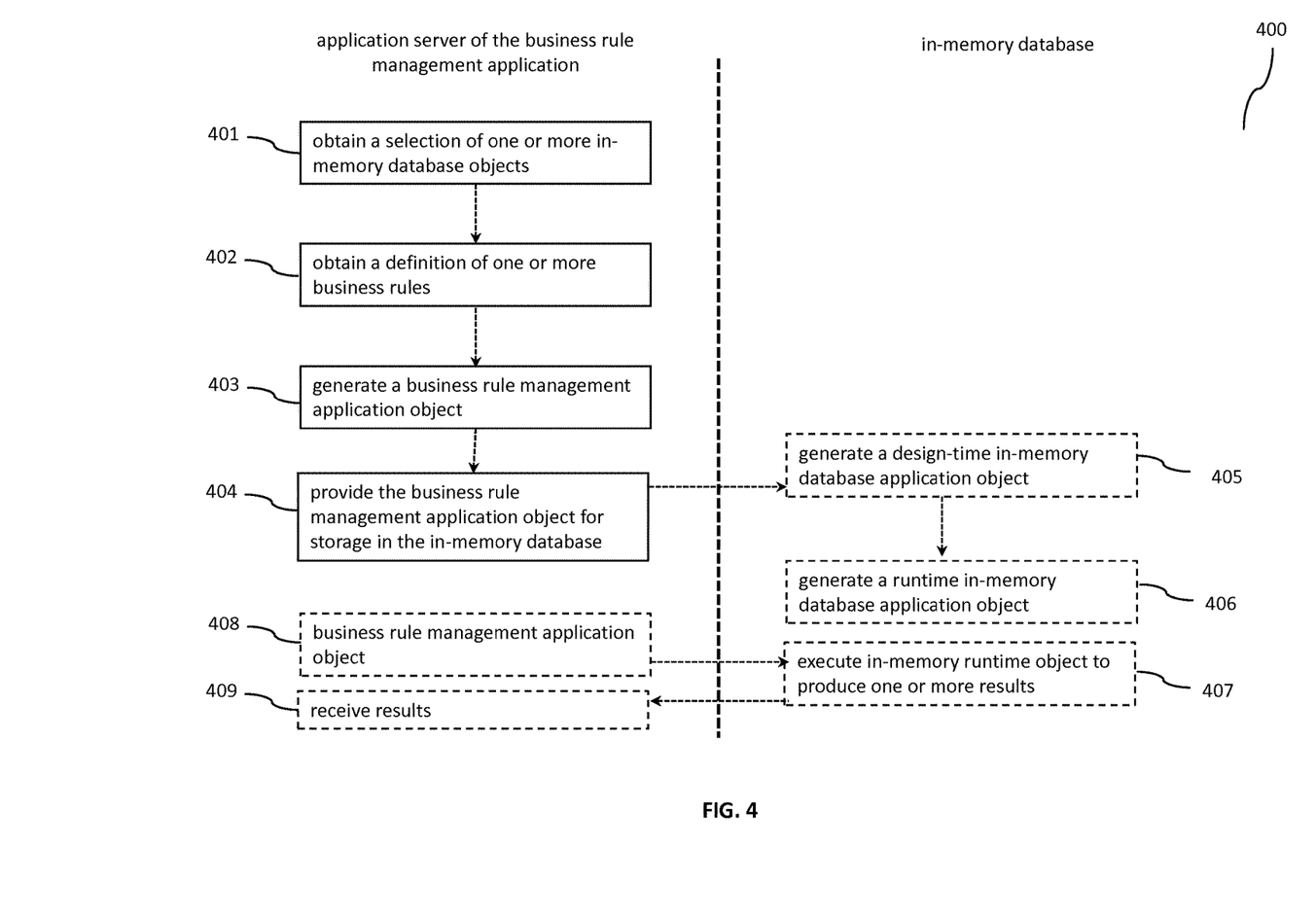
FIG. 4 illustrates an example computer implemented method for executing business logic in an in-memory database.

In FIG. 4, a selection of the processes described above is illustrated in a swim-lane diagram. In a first operation, a business rule management application obtains 401 a selection of one or more in-memory database objects. In a subsequent operation, the business rule management application obtains (402) a definition of one or more business rules (i.e., a definition of a piece of business logic). The business rule management application object can include a representation of the one or more business rules and a representation of one or more results of the application of the one or more business rules on the one or more in-memory database objects. Alternatively or in addition, the business rule management application object can include one or more of the other elements described above. Then, a business rule management application object is generated 403. This can take place on the application server of the business rule management application or in another environment (e.g., the metadata of the business rule management application object can be transmitted to the other environment). In a subsequent step, the business rule management application object is provided 404 for storage in the in-memory database. Optionally, the process can include the operation of generating 405, based on the business rule management application object, a design time in-memory database application object including a representation of the one or more business rules. Then, in the in memory database, a runtime object of the business rule management application based on the business rule management application object can be generated 406. The business rule management application object can be called 408 from the business rule management application. The runtime in-memory database object can be executed 407 on the selected one or more in-memory database objects and one more results can be provided to the business rule management application. In the business rule management application, the one more results can be received for further processing.

At a high level, the servers and other components of a business rule management application and an in-memory database application described above as functional units are associated with a computer or processor. A computer or processor comprises an electronic computing unit (e.g., a processor) operable to receive, transmit, process, store, or manage data and information associated with an operating environment of the database system. As used in the present disclosure, the term "computer" or "processor" is intended to encompass any suitable processing device. The term "processor" is to be understood as being a single processor that is configured to perform operations as defined by one or more aspects described in this disclosure, or the "processor" comprises two or more processors, that are configured to perform the same operations, e.g. in a manner that the operations are distributed among the two or more processors. The processor may comprise multiple organic field-effect transistors or thin film transistors or a combination thereof. This may allow processing the operations in parallel by the two or more processors. The two or more processors may be arranged within a supercomputer, the supercomputer may comprise multiple cores allowing for parallel processing of the operations. For instance, computer or processor may be a desktop or a laptop computer, a cellular phone, a smartphone, a personal digital assistant, a tablet computer, an e-book reader or a mobile player of media. Furthermore, the operating environment of the database system can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures. In enterprise systems, there are OLTP (OnLine Transaction processing) systems used to carry out business processes of a company where employees and other stakeholders, such as suppliers or customers, follow a business process which may result in business documents created in a database of the OLTP system. The database system can include in-memory databases in addition to the persistent databases described in connection with FIGS. 1 and 2 and thereby exploit recent innovations in hardware to run a database in main memory. In an implementation of the present disclosure described herein, the servers may be types of a Java development platform, such as e.g., Enterprise JavaBeans® (EJB), J2EE Connector Architecture (JCA), Java Messaging Service (JMS), Java Naming and Directory Interface (JNDI), and Java Database Connectivity (JDBC), a ByDesign platform, SuccessFactors Platform, ERP Suite technology or in-memory database such as High Performance Analytic Appliance (HANA) platform. In an aspect, the servers may be based on two different of the above mentioned platforms.

Regardless of the particular implementation, "software" or "operations" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, the database system operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the operations in these processes may take place simultaneously, concurrently, and/or in different orders or combinations than shown. Moreover, operating environment may use processes with additional operations, fewer operations, and/or different operations, so long as the methods remain appropriate.

Aspects of the subject-matter and the operations described in this specification can be implemented in digital electronic circuitry, semiconductor circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) or "user interface" can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) "icons", some or all associated with a web browser, such as interactive fields, pull-down lists, and buttons operable by the user of the computing device hosting the UI. These and other UI icons may be related to or represent the functions of the web browser. The term "browser user interface" refers to a graphical user interface embedded in a web browser environment on the remote computing device. The browser user interface may be configured to initiate a request for a uniform resource locator (URL) and may be configured to display a retrieved web page such as an HTML coded web page. The browser user interface may comprise displayed or hidden icons which, upon activation, initiate an associated electronic process inside or outside the remote computing device. For example, the browser user interface may be Internet Explorer, Chrome or Firefox. "Creating an icon" is to be understood as generating a new icon on the user interface. "Modifying an icon" is to be understood as changing a property of an existing icon on the user interface. "Deleting an icon" is to be understood as vanishing an existing icon on the user interface, e.g., for replacement by a newly created icon. "Updating the user interface" thereby is to be understood as creating, modifying, or deleting an icon on the user interface.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the user interface described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Implementations of the subject-matter described in this specification can be implemented in a computing system that includes a back end component, e.g., as a server, or that includes a middleware component, e.g., an application server, or that includes a front end component, e.g., a user computer having a graphical user interface or a Web browser through which a user can interact with an implementation of the subject-matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some implementations, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any implementation or on the scope of what may be claimed, but rather as descriptions of features that may be specific to particular implementations of particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:
   obtaining, in a business rule management application, a user selection of one or more in-memory database objects;
   obtaining, in the business rule management application, a definition of one or more business rules;
   generating a business rule management application object, wherein the business rule management application object includes:
      a representation of the user selected one or more in-memory database objects, including a table type object including a representation of the one or more business rules, and
      a representation of one or more results of an application of the one or more business rules on the one or more in-memory database objects, wherein the one or more results are generated, at run-time and within an in-memory database associated with the one or more in-memory database objects, by applying the one or more business rules on the one or more in-memory database objects;
   providing the business rule management application object for storage in the in-memory database associated with the one or more in-memory database objects;
   obtaining data during a call of an in-memory procedure generated based on the business rule management application object;
   typing the obtained data with a table type defined in the table type object;
   executing the one or more business rules on the obtained data to obtain the one or more results of the application of the one or more business rules;
   adding one or more new database columns including the one or more results in the in-memory database; and
   providing the typed obtained data and the one or more new database columns including the one or more results to the business rule management application.

2. The computer implemented method of claim 1, wherein providing the business rule management application object for storage in the in-memory data base includes generating, based on the business rule management application object, an in-memory database application object including a representation of the one or more business rules.

3. The computer implemented method of claim 2, wherein the in-memory database application object includes an Extensible Markup Language (XML) object.

4. The computer implemented method of claim 3, further comprising storing the in-memory database application object in the in-memory database.

5. The computer-implemented method of claim 4, further comprising generating an in-memory runtime object based on the in-memory database application object.

6. The computer-implemented method of claim 5, wherein the in-memory runtime object includes an SQL procedure.

7. The computer implemented method of claim 5 or 6, wherein the in-memory runtime object includes one or more in-memory database objects including the one or more results of the application of the one or more business rules on the one or more in-memory database objects.

8. The computer implemented method of claim 7, wherein the one or more in-memory database objects include one or more new columns, the one or more new columns including the one or more results of the application of the one or more business rules on the one or more in-memory database objects.

9. The computer implemented method of claim 1, further comprising:
   generating a runtime object of the business rule management application based on the business rule management application object; and
   storing the runtime object of the business rule management application in the business rule management application.

10. The computer-implemented method of claim 9, further comprising:
    calling the runtime object of the business rule management application from the business rule management application;
    executing, within the in-memory database, the in-memory runtime object to produce one or more results of the application of the one or more business rules on the one or more in-memory database objects, and
    providing, from the in-memory database, the one or more results to the business rule management application.

11. The computer-implemented method of claim 10, wherein calling the runtime object includes generating a representation of the business rule management application object on a graphical user interface of the business rule management application.

12. The computer-implemented method of claim 11, wherein the representation displays information characterizing a set of input parameters corresponding to input parameters of an in-memory runtime object generated based on the business rule management application object.

13. The computer-implemented method of claim 11, wherein the representation displays information characterizing the one or more in-memory database objects.

14. The computer-implemented method of claim 11, wherein the representation displays information characterizing the one or more results.

15. The computer-implemented method of claim 11, calling the runtime object of the business rule management application includes executing an SQL command.

16. The computer-implemented method of claim 1, wherein the one or more business rules define a Boolean expression, a case expression, a decision table, a decision, a search tree, a loop expression, a database table operation, a value range check.

17. The computer implemented method of claim 1, wherein the one or more in-memory database objects include a table object, a table type object, an attribute view object, wherein an attribute view references one or more data items in other tables of the in-memory database, an analytical view object, wherein an analytic view defines on or more functions operable on data items in the in-memory data base, or an calculation view object, wherein a calculation view is operable to provide composites of other views.

18. A computer readable medium storing instructions thereon which when executed by a processor cause the processor to:
- obtain, in a business rule management application, a user selection of one or more in-memory database objects;
- obtain, in the business rule management application, a definition of one or more business rules;
- generate a business rule management application object, wherein the business rule management application object includes:
  - a representation of the user selected one or more in-memory database objects, including a table type object including a representation of the one or more business rules, and
  - a database object including one or more results of an application of the one or more business rules on the one or more in-memory database objects, wherein the one or more results are generated, at run-time and within an in-memory database associated with the one or more in-memory database objects, by applying the one or more business rules on the one or more in-memory database objects;
- provide the business rule management application object for storage in the in-memory database associated with the one or more in-memory database objects;
- obtain data during a call of an in-memory procedure generated based on the business rule management application object;
- type the obtained data with a table type defined in the table type object;
- execute the one or more business rules on the obtained data to obtain the one or more results of the application of the one or more business rules;
- add one or more new database columns including the one or more results in the in-memory database; and
- provide the typed obtained data and the one or more new database columns including the one or more results to the business rule management application.

19. A system comprising:
one or more processors; and
a computer-readable medium storing instructions executable by the one or more processors to perform operations comprising:
- obtain, in a business rule management application, a user selection of one or more in-memory database objects;
- obtain, in the business rule management application, a definition of one or more business rules;
- generate a business rule management application object, wherein the business rule management application object includes:
  - a representation of the user selected one or more in-memory database objects, including a table type object including a representation of the one or more business rules, and
  - a database object including one or more results of an application of the one or more business rules on the one or more in-memory database objects, wherein the one or more results are generated, at run-time and within an in-memory database associated with the one or more in-memory database objects, by applying the one or more business rules on the one or more in-memory database objects;
- provide the business rule management application object for storage in the in-memory database associated with the one or more in-memory database objects;
- obtain data during a call of an in-memory procedure generated based on the business rule management application object;
- type the obtained data with a table type defined in the table type object;
- execute the one or more business rules on the obtained data to obtain the one or more results of the application of the one or more business rules;
- add one or more new database columns including the one or more results in the in-memory database; and
- provide the typed obtained data and the one or more new database columns including the one or more results to the business rule management application.

* * * * *